US009330267B2

(12) United States Patent
Abe et al.

(10) Patent No.: US 9,330,267 B2
(45) Date of Patent: *May 3, 2016

(54) FILTERING CONFIDENTIAL INFORMATION IN VOICE AND IMAGE DATA

(71) Applicant: Nuance Communications, Inc., Burlington, MA (US)

(72) Inventors: Seiji Abe, Hyogo (JP); Mitsuru Shioya, Tokyo (JP); Shigeki Takeuchi, Tokyo (JP); Daisuke Tomoda, Kanagawa-ken (JP)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,076

(22) Filed: Jun. 20, 2014

(65) Prior Publication Data

US 2014/0373163 A1    Dec. 18, 2014

Related U.S. Application Data

(63) Continuation of application No. 13/310,926, filed on Dec. 5, 2011, now Pat. No. 8,913,744.

(30) Foreign Application Priority Data

Dec. 8, 2010  (JP) .................................. 2010-273385

(51) Int. Cl.
G10L 15/26    (2006.01)
G06F 21/60    (2013.01)
G06F 17/30    (2006.01)

(52) U.S. Cl.
CPC .......... *G06F 21/60* (2013.01); *G06F 17/30787* (2013.01); *G06F 17/30796* (2013.01)

(58) Field of Classification Search
USPC .......................................... 380/252
See application file for complete search history.

(56) References Cited

U.S. PATENT DOCUMENTS 8,913,744 B2    12/2014  Abe et al.
2006/0089857 A1*  4/2006  Zimmerman et al. ............ 705/2
(Continued)

FOREIGN PATENT DOCUMENTS

JP    2006-083762    3/2006
JP    2008-096842 A   4/2008
(Continued)

OTHER PUBLICATIONS

Notice of Allowance and Fees Due for U.S. Appl. No. 13/310,926; Date Mailed: Sep. 3, 2014; entitled: "Filtering Confidential Information in Voice and Image Data".

*Primary Examiner* — Tu Nguyen
(74) *Attorney, Agent, or Firm* — Hamilton, Brook, Smith & Reynolds, P.C.

(57) ABSTRACT

Confidential information included in image and voice data is filtered in an apparatus that includes an extraction unit for extracting a character string from an image frame, and a conversion unit for converting audio data to a character string. The apparatus also includes a determination unit for determining, in response to contents of a database, whether at least one of the image frame and the audio data include confidential information. The apparatus also includes a masking unit for concealing contents of the image frame by masking the image frame in response to determining that the image frame includes confidential information, and for making the audio data inaudible by masking the audio data in response to determining that the audio data includes confidential information. The playback unit included in the apparatus is for playing back the image frame and the audio data.

18 Claims, 9 Drawing Sheets

(56) References Cited

U.S. PATENT DOCUMENTS

| | | |
|---|---|---|
| 2006/0218191 A1 | 9/2006 | Gopalakrishnan |
| 2007/0299870 A1* | 12/2007 | Finch .................. 707/104.1 |
| 2010/0010968 A1 | 1/2010 | Redlich et al. |

FOREIGN PATENT DOCUMENTS

| | | |
|---|---|---|
| JP | 2010-72098 | 9/2008 |
| JP | 2008-299126 A | 12/2008 |
| JP | 2008299126 | 12/2008 |
| JP | 2009-048570 A | 3/2009 |
| JP | 2009109913 | 5/2009 |
| JP | 4312246 | 8/2009 |
| JP | 2010-098570 A | 4/2010 |
| JP | 2010-198247 A | 9/2010 |
| WO | WO 2008/132143 A1 | 11/2008 |
| WO | WO 2010/038764 A1 | 4/2010 |

* cited by examiner

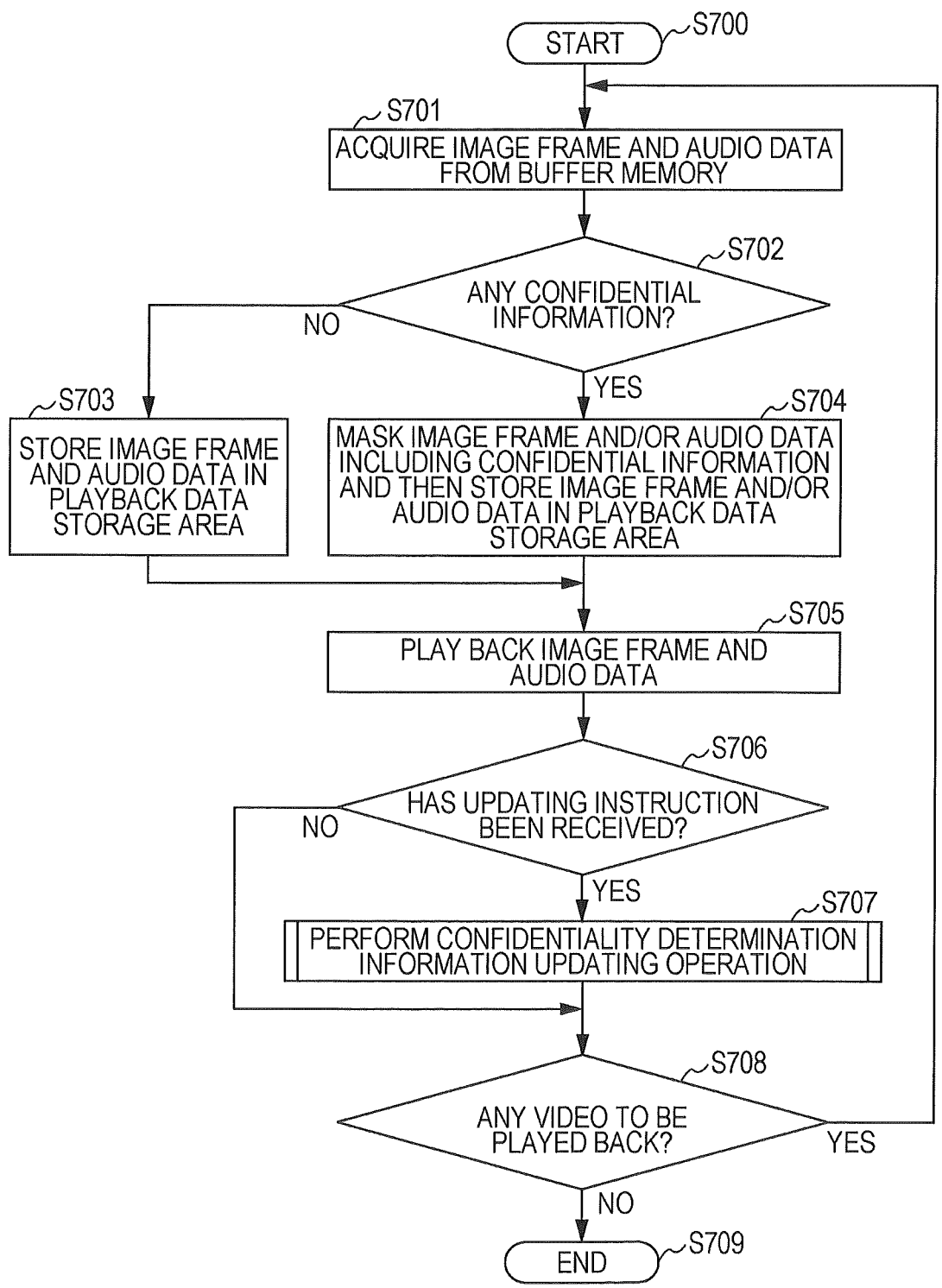

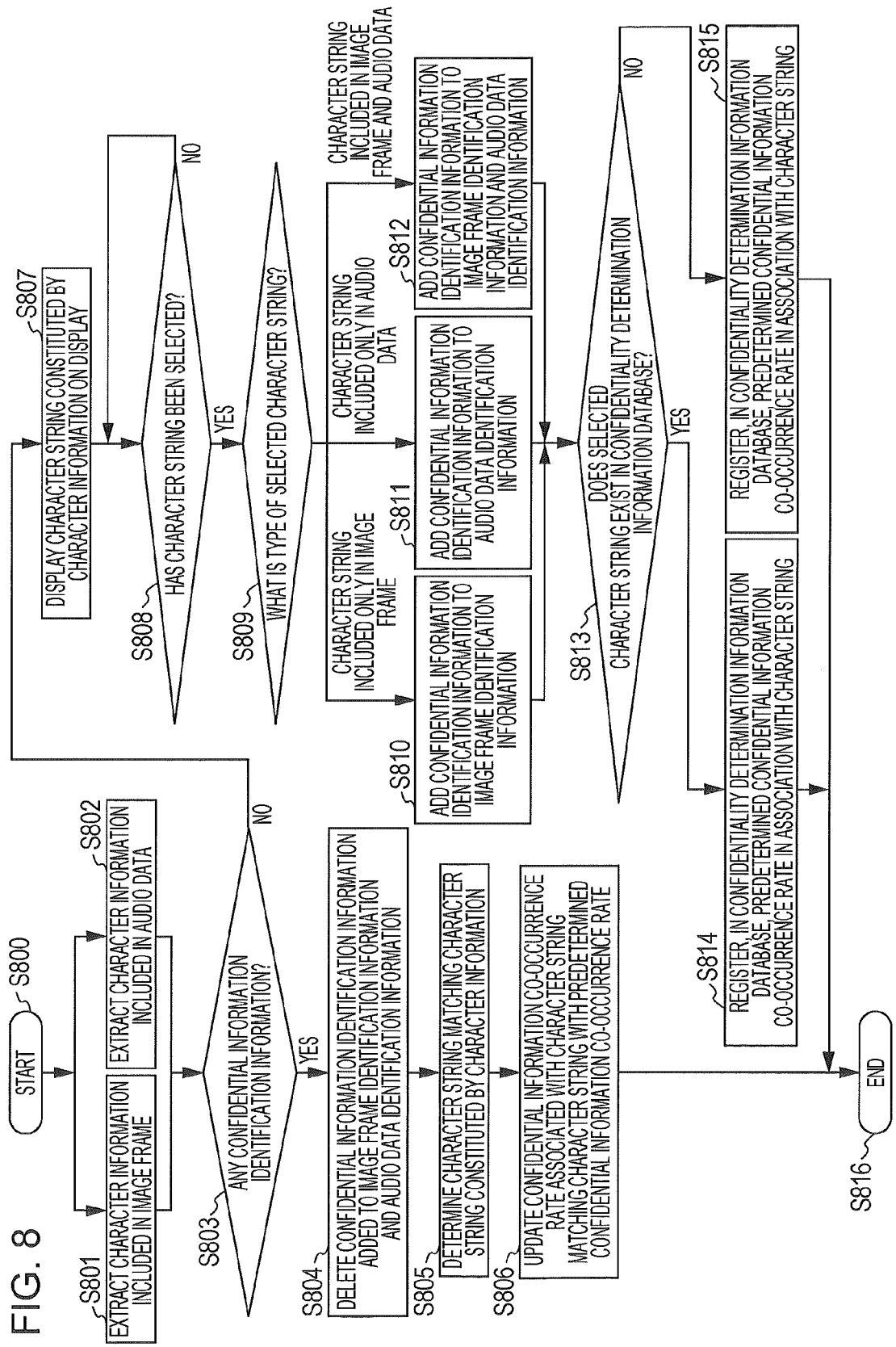

FIG. 9

| REGISTERED CHARACTER STRING | CONFIDENTIAL INFORMATION CO-OCCURRENCE RATE |
|---|---|
| O-NAMAE O (NAME) | 0.3 |
| O-NAMAE TO GO-JUUSHO WA (NAME AND ADDRESS ARE) | 0.9 |
| O-NAMAE TO GO-JUUSHO O (NAME AND ADDRESS) | 0.3 |
| O-NAMAE TO GO-JUUSHO O O-SHIRASE (TELL NAME AND ADDRESS) | 0.3 |
| O-NAMAE TO GO-JUUSHO O O-SHIRASE-SHIMASU (WILL TELL NAME AND ADDRESS) | 0.9 |
| O-NAMAE TO GO-JUUSHO O O-SHIRASE-KUDASAI (PLEASE, TELL YOUR NAME AND ADDRESS) | 0.4 |
| O-NAMAE TO DENWA-BANGOO WA (NAME AND TELEPHONE NUMBER ARE) | 0.9 |
| O-NAMAE TO DENWA-BANGOO O (NAME AND TELEPHONE NUMBER) | 0.3 |
| O-NAMAE TO DENWA-BANGOO O O-SHIRASE (TELL NAME AND TELEPHONE NUMBER) | 0.3 |
| O-NAMAE TO DENWA-BANGOO O O-SHIRASE-SHIMASU (WILL TELL NAME AND TELEPHONE NUMBER) | 0.9 |
| O-NAMAE TO DENWA-BANGOO O O-SHIRASE-KUDASAI (PLEASE, TELL YOUR NAME AND TELEPHONE NUMBER) | 0.4 |
| ANATA NO KOOZA-BANGOO WA (YOUR ACCOUNT NUMBER) | 0.9 |
| ⋮ | ⋮ |

FILTERING CONFIDENTIAL INFORMATION IN VOICE AND IMAGE DATA

This application is a continuation of U.S. application Ser. No. 13/310,926, filed Dec. 5, 2011. This application claims priority under 35 U.S.C. §119 or 365 to Japan, Application No. 2010-273385, filed Dec. 8, 2010. The entire teachings of the above application(s) are incorporated herein by reference.

BACKGROUND

The present invention generally relates to filtering sensitive or confidential information, and in particular to filtering confidential information included in image and voice data.

In recent years, the number of users of portable information processing apparatuses, for example, third generation cellular phones and smart phones, is increasing. Many portable information processing apparatuses typified by, for example, by the iPhone®, iPod®, and iPad® devices from Apple Inc., can play back video, and the portability enables viewing of video in various scenes.

Recently, as the use of such multifunction portable information processing apparatuses have become more widespread, many users have come to view various types of video in crowds in, for example, in trains and restaurants. Some video to be played back includes, in addition to movies and video clips, confidential information, for example, secret information and private information that involves a confidentiality obligation and is provided by, for example, electronic commerce including Internet banking and Internet shopping, webcasts, and e-meetings. Viewing of such video in a crowd may result in leakage of confidential information.

Previous approaches to preventing leakage of confidential information include extracting improper display information from a display image on a monitor, determining an evaluation value of the display image in a manner that depends on the display information, and controlling the display image on the basis of the evaluation value. This approach determines the presence or absence of confidential information to be filtered using, for example, only characters and an image included in a display image. Thus, for example, when a voice in a video to be played back includes confidential information, the security system cannot determine the presence or absence of the confidential information included in the voice and thus cannot prevent leakage of the confidential information. In addition, previous approaches do not include a component feeding back the result of the determination of confidential information in a display image. Thus, even when the determination of confidential information is inappropriate, the result of the determination cannot be fed back to the security system, and the accuracy of determination of confidential information cannot be improved.

SUMMARY

An embodiment is an information processing apparatus for filtering confidential information included in image and voice data. The information processing apparatus includes an extraction unit configured for extracting a character string from an image frame, a conversion unit, a database, a determination unit, a masking unit, and a playback unit. The conversion unit is configured for converting audio data to a character string. The database is configured for registering determination information for determining confidential information. The determination unit is configured for determining, in response to contents of the database, whether at least one of the image frame and the audio data include confidential information. The masking unit is configured for concealing contents of the image frame by masking the image frame in response to determining that the image frame includes confidential information. The masking unit is also configured for making the audio data inaudible by masking the audio data in response to determining that the audio data includes confidential information. The playback unit is configured for playing back the image frame and the audio data.

Other embodiments include a method and a computer program product for filtering confidential information included in image and voice data. A character string is extracted from an image frame, and audio data is converted to a character string. It is determined, in response to contents of a database, whether at least one of the image frame and the audio data includes confidential information. The image frame is concealed by masking the image frame in response to determining that the image frame includes confidential information. The audio data is made inaudible by masking the audio data in response to determining that the audio data includes confidential information. The image frame and the audio data are played back.

BRIEF DESCRIPTION OF THE DRAWINGS

The drawings referenced in the present application are only used to exemplify typical embodiments of the present invention and should not be considered to be limiting the scope of the present invention.

FIG. 7 is a flowchart illustrating a process of the information processing apparatus according to an embodiment updating confidential information after streaming playback of video data is completed.

FIG. 8 is a flowchart illustrating a confidentiality determination information updating operation to be performed by the information processing apparatus according to an embodiment after streaming playback is completed.

FIG. 9 is an illustration showing a confidentiality determination information data table registered in a confidentiality determination information database according to the embodiment.

DETAILED DESCRIPTION

Embodiments of the present invention filter confidential information included in image and voice data. Embodiments also improve the accuracy of determining whether information is confidential. According to embodiments of the present invention, an information processing apparatus is provided. The information processing apparatus extracts a character string from an image frame, converts audio data to a character string, determines whether these character strings include confidential information, and makes an image frame and/or audio data that contains confidential information not visible (e.g., concealed) or inaudible by masking the image frame and/or the audio data. Thus, embodiments of the present invention provide for the filtering of confidential information included in image and voice data.

In accordance with an embodiment, the information processing apparatus also updates a database on the basis of a user instruction. In the database, character strings that may co-occur with confidential information and respective confidential information co-occurrence rates of the character strings are registered in association with each other as determination information for determining confidential information. Thus, embodiments of the present invention are used to improve the accuracy of determining whether information is confidential information.

As used herein, the term "co-occurrence rate" refers to a measurement of how often a particular character string is associated with confidential information. The co-occurrence rate is used to determine when to mask an image frame or audio data associated with the character string. In an embodiment, a programmable threshold value is compared to the co-occurrence rate and if the co-occurrence rate exceeds the threshold value, the image frame or audio data associated with the character string is removed from the video data.

Figure 1:
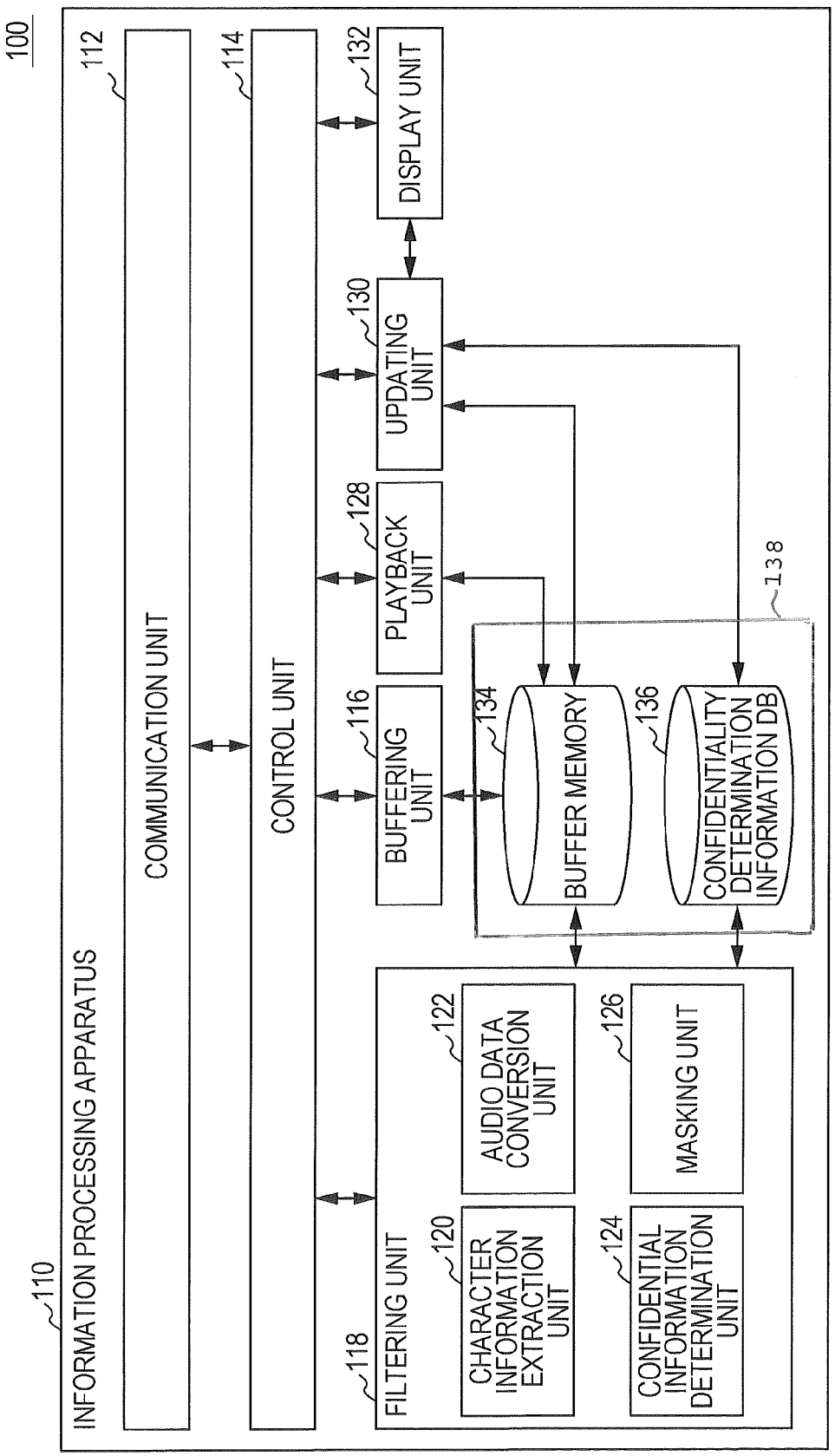
FIG. 1 is an illustration showing a functional configuration of an information processing apparatus according to an embodiment.

FIG. 1 illustrates a functional configuration 100 of an information processing apparatus 110 according to an embodiment. The information processing apparatus 110 is an information processing apparatus that can play back video. The information processing apparatus 110 can play back video data distributed by a video distribution server (not shown) through, e.g., streaming and downloading. Examples of portable information processing apparatuses that can be adopted as the information processing apparatus 110 include, but are not limited to: an iPhone, iPod, or iPad device from Apple Inc., a GALAXY S® device from Samsung, and a smart phone from Sharp Corporation such as an IS03 or GALAPAGOS.

The information processing apparatus 110 executes a program to carry out an embodiment of the present invention described in a programming language, for example, assembler, C, C++, Java®, JavaScript®, PERL, PHP, RUBY, and/or PYTHON, under the control of an operating system (OS), for example, Windows®7, Windows Vista®, Windows XP, or Windows Mobile, Mac OS®, iOS series for iPhone, and iPad, UNIX®, LINUX®, Google Chrome OS, Android®, TRON®, and/or iTRON.

Moreover, the information processing apparatus 110 includes, for example, a random access memory (RAM) providing an execution space for executing the program of an embodiment of the present invention and a hard disk unit (HDD) continuously storing programs, data, and the like. Functions according to the embodiment described below are implemented on the information processing apparatus 110 by executing a computer program. Functional components according to an embodiment can be implemented by the apparatus executable program described in, for example, the aforementioned programming language. The program of an embodiment of the present invention can be stored in an apparatus readable recording medium, for example, but not limited to: a hard disk drive (HDD), a compact disk read only memory (CD-ROM), a magnetic optical (MO) storage, a flexible disk, an electrically erasable programmable read only memory (EEPROM), or an erasable programmable read only memory (EPROM), to be distributed, or the program can be transmitted in a form that can be read by another apparatus via a network.

The information processing apparatus 110 shown in FIG. 1 includes a communication unit 112, a control unit 114, a storage unit 138, a filtering unit 118, a playback unit 128, an updating unit 130, and a display unit 132. In an embodiment, the storage unit 138 is implemented by one or more ROMs and HDDs. As shown in FIG. 1, the storage unit 138 includes a buffer memory 134 and a confidentiality determination information database 136.

The communication unit 112 processes data communicated between the information processing apparatus 110 and a video distribution server. Upon receiving video data from the video distribution server, the communication unit 112 notifies the control unit 114 of receipt of the video data.

The control unit 114 performs the overall control of the information processing apparatus 110. The control unit 114 calls the buffering unit 116, the filtering unit 118, the playback unit 128, the updating unit 130, and the display unit 132 as necessary to perform various types of operations that can be performed by these functional components.

The buffering unit 116 stores video data distributed by the video distribution server in the buffer memory 134. Upon receiving video data, the buffering unit 116 adds respective pieces of information for allowing unique identification of an image frame and audio data (hereinafter referred to as image frame identification information and audio data identification information) constituting the video data to the image frame and the audio data as metadata of the image frame and the audio data and then stores the video data in the buffer memory 134.

In an embodiment, the combination of a time stamp indicating a date and time when video data was acquired and a file extension of an image frame or audio data can be used as image frame identification information or audio data identification information. The buffering unit 116 can generate image frame identification information or audio data identification information using time information provided by a timer, for example, a hardware timer or software timer of the information processing apparatus 110.

Moreover, in an embodiment, the length of first audio data stored in the buffer memory 134 is the same as the playback time of a first image frame, and the respective pieces of identification information of the image frame and the audio data forming a pair include the same time stamp. Moreover, a time stamp used in the embodiment can indicate time information for allowing unique identification of adjacent image frames, i.e., time information in, for example, milliseconds or microseconds such as 2010 Oct. 12 11:15:6.234.

The filtering unit 118 masks an image frame and audio data that are buffered to the buffer memory 134 and include confidential information, for example, private information and secret information by filtering the image frame and the audio data. The filtering unit 118 includes a character information extraction unit 120, an audio data conversion unit 122, a confidential information determination unit 124, and a masking (in case of audio data, bleeping out) unit 126.

The character information extraction unit 120 extracts character information from an image frame. The character information extraction unit 120 sequentially acquires image frames buffered into the buffer memory 134 in a first in first out (FIFO) manner and extracts character information that is text data by comparing character images included in the image frames with a template in which various types of characters are registered. In an embodiment, character code, for example, Japanese Industrial Standard (JIS) code, Shift JIS code, or Unicode, is used as character information.

In an embodiment, the character information extraction unit 120 stores the extracted character information in the storage unit 138 in the information processing apparatus 110. The storage unit 138 can be referred to by another functional component. The other functional component can acquire the character information from the storage unit 138.

The audio data conversion unit 122 converts spoken language included in audio data to character information. The audio data conversion unit 122 sequentially acquires pieces of audio data buffered into the buffer memory 134 in a FIFO manner and converts spoken language included in the pieces of audio data to character information that is text data.

The audio data conversion unit 122 can convert audio data to character information using, for example, a voice recognition technique such as that disclosed in Japanese Patent Application Publication No. 2010-072098. That is, the audio data conversion unit 122 can recognize words or phrases represented by audio signals constituting audio data and convert the words or phrases to character information, using an acoustic model that is a statistical model in which acoustic features showing the frequency characteristics of a character string to be recognized are defined and a language model that is a probability model showing restrictions on Japanese sentences or dictionary data in which words to be recognized are registered.

In an embodiment, the audio data conversion unit 122 extracts character information from audio signals constituting audio data of a predetermined length. Moreover, any length of audio data processed by the audio data conversion unit 122 in one conversion operation may be selected.

In an embodiment, the audio data conversion unit 122 stores generated character information in the storage unit 138 in the information processing apparatus 110. The storage unit 138 can be referred to by another functional component. The other functional component can acquire the character information from the storage unit 138.

The confidential information determination unit 124 determines whether an image frame and/or audio data includes confidential information. The confidential information determination unit 124 determines whether an image frame and/or audio data includes confidential information by determining whether confidential information cooccurs in a character string constituted by character information generated by the character information extraction unit 120 and the audio data conversion unit 122.

In detail, the confidential information determination unit 124 determines, referring to the confidentiality determination information database 136, whether a character string constituted by character information generated by the character information extraction unit 120 and the audio data conversion unit 122 matches any character string registered in the confidentiality determination information database 136 (hereinafter referred to as a registered character string). Then, when the character string constituted by the character information generated by the character information extraction unit 120 and the audio data conversion unit 122 matches a registered character string, the confidential information determination unit 124 determines, using a confidential information co-occurrence rate associated with the registered character string, whether the character information includes confidential information.

Upon determining that confidential information is included, the confidential information determination unit 124 adds identification information indicating that confidential information exists (hereinafter referred to as confidential information identification information) to the image frame identification information of an image frame or the audio data identification information of audio data including the character information.

In an embodiment, information on presence or absence of confidential information is managed by adding confidential information identification information to image frame identification information or audio data identification information. In another embodiment, information on the presence or absence of confidential information is managed by adding, to the image frame identification information of an image frame or the audio data identification information of audio data in which confidential information has occurred, identification information indicating that confidential information has occurred and adding, to the image frame identification information of an image frame or the audio data identification information of audio data from which confidential information has been removed, identification information indicating that confidential information has been removed. In yet another embodiment, information on presence or absence of confidential information is managed by registering, in a database, image frame identification information or audio data identification information in association with identification information indicating that confidential information exists or identification information indicating that confidential information does not exist.

The masking unit 126 masks video data including confidential information to make the confidential information not visible and inaudible. The masking unit 126 performs a scrambling operation on an image frame including confidential information as an operation of masking the image frame to make the confidential information not visible and inaudible. Moreover, the masking unit 126 may replace an image frame including confidential information with another image frame (for example, an image frame colored in, e.g., black and white or a predetermined substitute frame including no confidential information) to make the confidential information not visible.

The masking or bleeping out unit 126 performs conversion of audio data including confidential information to other audio data, for example, audio data including no sound or audio data constituted by predetermined frequency sounds as an operation of masking the audio data to make the confidential information inaudible.

The playback unit 128 plays back video data. The playback unit 128 sequentially acquires image frames and pieces of audio data from a memory area (hereinafter referred to as a playback data storage area) in the storage unit 138 in the information processing apparatus 110 where image frames and pieces of audio data to be played back are stored and plays back the image frames and the pieces of audio data. In an embodiment, the playback unit 128 plays back image frames and pieces of audio data including no confidential information and thus having not been masked and image frames and pieces of audio data having been masked. In another embodiment, when audio data includes confidential information, the audio data is played back after the playback volume of the audio data to be played back is decreased to an inaudible level. In yet another embodiment, in response to a user instruction, the playback unit 128 plays back video data stored in the buffer memory 134 in a state in which the video data is not masked.

The updating unit 130 updates information for determining confidential information (hereinafter referred to as confidentiality determination information) registered in the confidentiality determination information database 136. The updating unit 130 updates, as confidentiality determination information, registered character strings that are registered in the confidentiality determination information database 136 and in which confidential information may co-occur and respective confidential information co-occurrence rates registered in association with the registered character strings. In the embodiment, the updating unit 130 can perform updating by increasing or decreasing, by a predetermined value, a confidential information co-occurrence rate associated with a registered character string specified by a user. The confidentiality determination information database 136, together with the data content, will be described in detail referring to FIG. 9.

The display unit 132 displays various screens on a display in the information processing apparatus 110. The display unit 132 can display, for example, a screen for registering the confidentiality determination information database 136, a screen including buttons that can issue, e.g., respective instructions to update and correct the confidentiality determination information database 136, and a screen for sending a notification indicating that the confidentiality determination information database 136 has been updated or corrected. Data constituting a display screen of the embodiment is loaded into the RAM in the information processing apparatus when the program of an embodiment of the present invention is executed, and the display unit 132 can display a notification screen using the constituent data.

In an embodiment, the information processing apparatus 110 includes a touch panel display and can determine, by detecting user's contact with the display or the contact position, that, for example, an instruction to register or an instruction to update the confidentiality determination information database has been issued. In another embodiment, the information processing apparatus 110 includes input means, for example, a keyboard to which the respective functions of the aforementioned buttons are assigned, and can determine, by detecting depression of the input means, that, for example, an instruction to register or an instruction to update the confidentiality determination information database has been issued.

Figure 2:
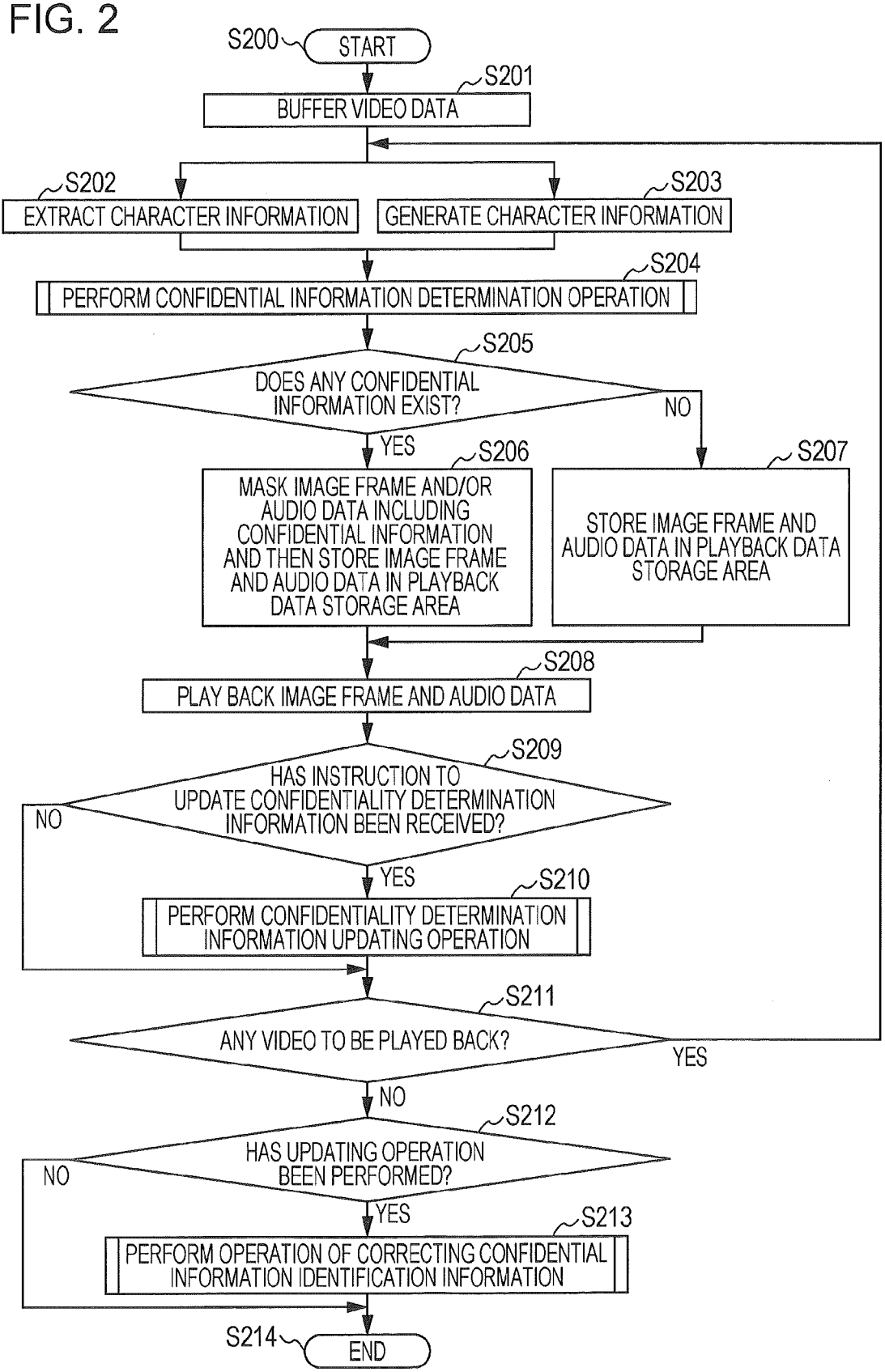
FIG. 2 is a flowchart illustrating a process to be performed by the information processing apparatus according to an embodiment.

FIG. 2 is a flowchart illustrating a process to be performed by the information processing apparatus according to an embodiment. The process to be performed by the information processing apparatus 110 will next be described referring to FIG. 2.

The process in FIG. 2 is started when video data has been received from the video distribution server in block S200. In block S201, the control unit 114 calls the buffering unit 116, and the buffering unit 116 adds identification information to the video data received from the video distribution server and then buffers the video data to the buffer memory 134. In the embodiment, the information processing apparatus 110 performs buffering of video data and operations in blocks S202 to S211, described below, in parallel.

When buffering of the video data is started in block S201, in block S202, the control unit 114 calls the character information extraction unit 120, and the character information extraction unit 120 extracts character information from an image frame constituting the video. In block S203, the control unit 114 calls the audio data conversion unit 122, and the audio data conversion unit 122 generates character information from audio data constituting the video.

After the operations in blocks S202 and S203 are completed, in block S204, the control unit 114 calls the confidential information determination unit 124, and the confidential information determination unit 124 performs a confidential information determination operation of determining presence or absence of confidential information in the video data. An embodiment of the confidential information determination operation will be described in detail referring to FIG. 3.

In block S205, the control unit 114 determines, from the result of the confidential information determination operation performed in block S204, whether confidential information exists in the image frame and the audio data. When the control unit 114 determines that confidential information exists (yes), the process is caused to branch to block S206. In block S206, the control unit 114 calls the masking unit 126 to cause the masking unit 126 to mask the image frame and/or the audio data including the confidential information. Then, the control unit 114 stores the image frame and the audio data having been subjected to masking in the playback data storage area. In an embodiment, the playback storage area is part of the storage unit 138 illustrated in FIG. 1. On the other hand, when the control unit 114 determines that no confidential information exists (no), the process is caused to branch to block S207. In block S207, the control unit 114 stores the image frame and the audio data in the playback data storage area without performing a masking operation.

In block S208, the control unit 114 calls the playback unit 128, and the playback unit 128 plays back the image frame and the audio data stored in the playback data storage area. In block S209, the control unit 114 determines whether an instruction to update confidentiality determination information has been received.

In an embodiment, the control unit 114 may store, in the storage unit 138, an instruction to update confidentiality determination information, the instruction being an interrupt instruction issued by a user pressing a button for updating confidentiality determination information. The control unit 114 can determine, referring to the storage unit 138, whether an instruction to update confidentiality determination information has been received.

When the control unit 114 determines, in the determination in block S209, that an instruction to update confidentiality determination information has been received (yes), the process is caused to branch to block S210. In block S210, the control unit 114 calls the updating unit 130 to cause the updating unit 130 to perform a confidentiality determination information updating operation that will be described referring to FIG. 4. On the other hand, when the control unit 114 determines that no instruction to update confidentiality determination information has been received (no), the process is caused to branch to block S211.

In block S211, the control unit 114 determines, referring to the buffer memory 134, whether any video data to be played back exists. When video data to be played back exists (yes), the process is caused to return to blocks S202 and S203 to repeat the aforementioned operations. On the other hand, when the control unit 114 determines that no video to be played back exists (no), the process is caused to branch to block S212.

In block S212, the control unit 114 determines whether the confidentiality determination information updating operation has been performed in block S210. In the embodiment, when calling the updating unit 130 in block S210, the control unit 114 may store, for example, flag information indicating that the updating operation has been performed in the storage unit 138 and determine, using the flag information, whether the updating operation has been performed.

When the control unit 114 determines, in the determination in block S212, that the updating operation has been performed (yes), the process is caused to branch to block S213. In block S213, the control unit 114 performs an operation of correcting confidential information identification information that will be described referring to FIG. 6. Then, in block S214, the process is terminated. On the other hand, when the control unit 114 determines, in the determination in block S212, that no updating operation has been performed (no), the process is caused to branch to block S214 where the process is terminated.

Figure 3:
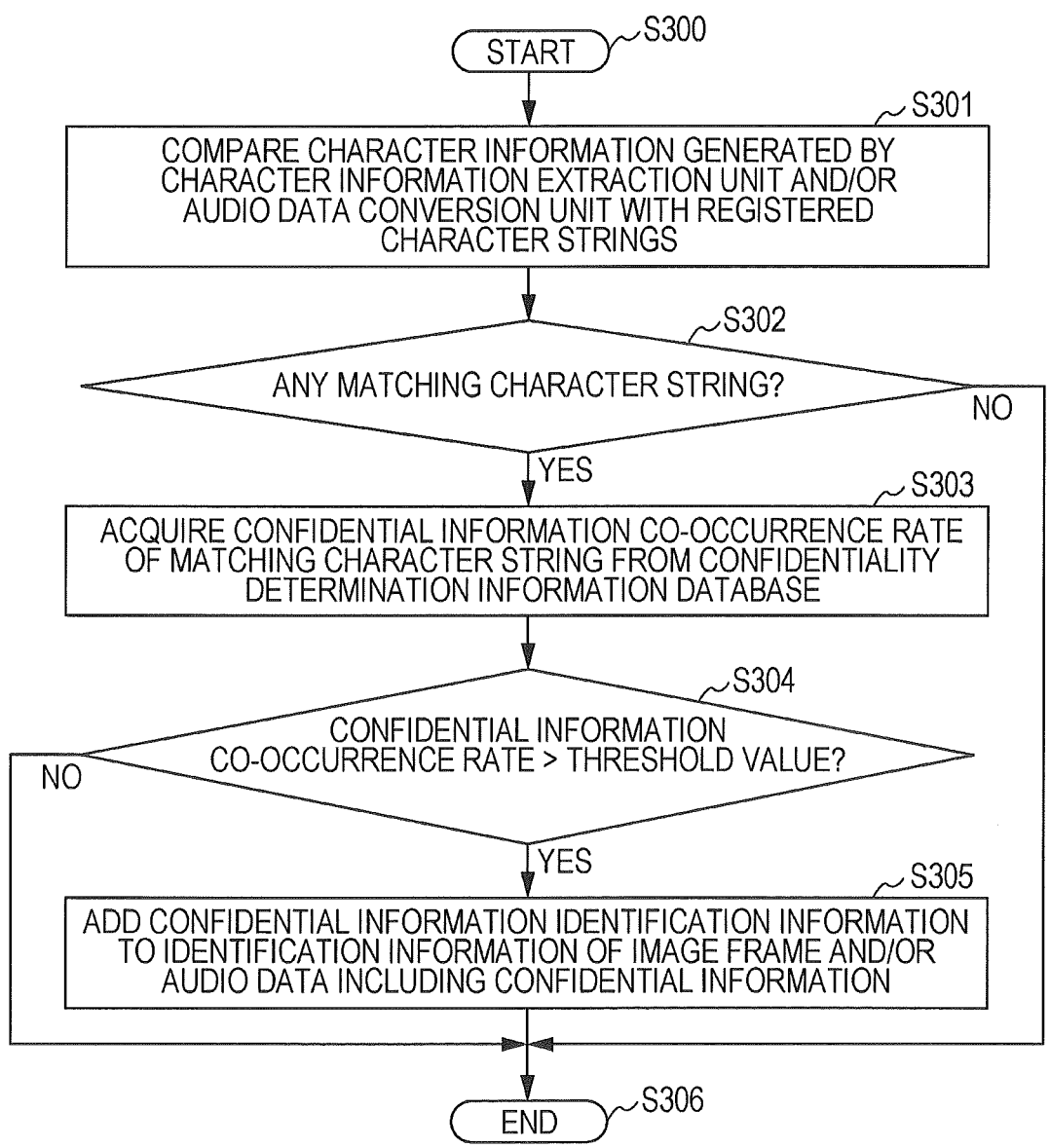
FIG. 3 is a flowchart illustrating a confidential information determination operation to be performed by the information processing apparatus according to an embodiment.

FIG. 3 is a flowchart illustrating the confidential information determination operation to be performed by the information processing apparatus according to an embodiment. The confidential information determination operation will next be described referring to FIG. 3.

The process in FIG. 3 is started from block S300 by the control unit 114 calling the confidential information determination unit 124 in the operation in block S204 shown in FIG. 2. In block S301, the confidential information determination unit 124 compares, referring to the confidentiality determination information database 136, a character string constituted by character information generated in the operations in blocks S202 and S203 shown in FIG. 2 with registered character strings in the confidentiality determination information database 136.

In block S302, the confidential information determination unit 124 determines whether these character strings match each other. When these character strings match each other (yes), the process is caused to branch to block S303. On the other hand, when these character strings do not match each other (no), the process is caused to branch to block S306 where the process is terminated.

In block S303, the confidential information determination unit 124 acquires, referring to the confidentiality determination information database 136, a confidential information co-occurrence rate associated with a registered character string determined as being a matching character string in block S302. In block S304, the confidential information determination unit 124 determines whether the confidential information co-occurrence rate acquired in block S303 exceeds a predetermined threshold value. When the confidential information determination unit 124 determines that the confidential information co-occurrence rate is equal to or less than the predetermined threshold value, i.e., when the confidential information determination unit 124 determines that the probability that the character string includes confidential information is low (no), the process is caused to branch to block S306 where the process is terminated.

On the other hand, when the confidential information determination unit 124 determines that the confidential information co-occurrence rate exceeds the predetermined threshold value, i.e., when the confidential information determination unit 124 determines that the character string includes confidential information (yes), the process is caused to branch to block S305. In block S305, the confidential information determination unit 124 adds confidential information identification information to the identification information of an image frame and/or audio data having been buffered to the buffer memory 134 and including character information constituting the character string, and then, the process is terminated in block S306.

In an embodiment, the confidential information determination unit 124 adds confidential information identification information to each of image frame identification information and audio data identification information. The confidential information determination unit 124 stores, in the storage unit 138 in the information processing apparatus 110, information indicating that the character information constituting the character string determined as matching a registered character string in block S302 has been extracted from an image frame and/or information indicating that the character information has been generated from audio data. Then, the confidential information determination unit 124 can determine, referring to these pieces of information, whether confidential information is included in an image frame, audio data, or in both an image frame and audio data.

Figure 4:
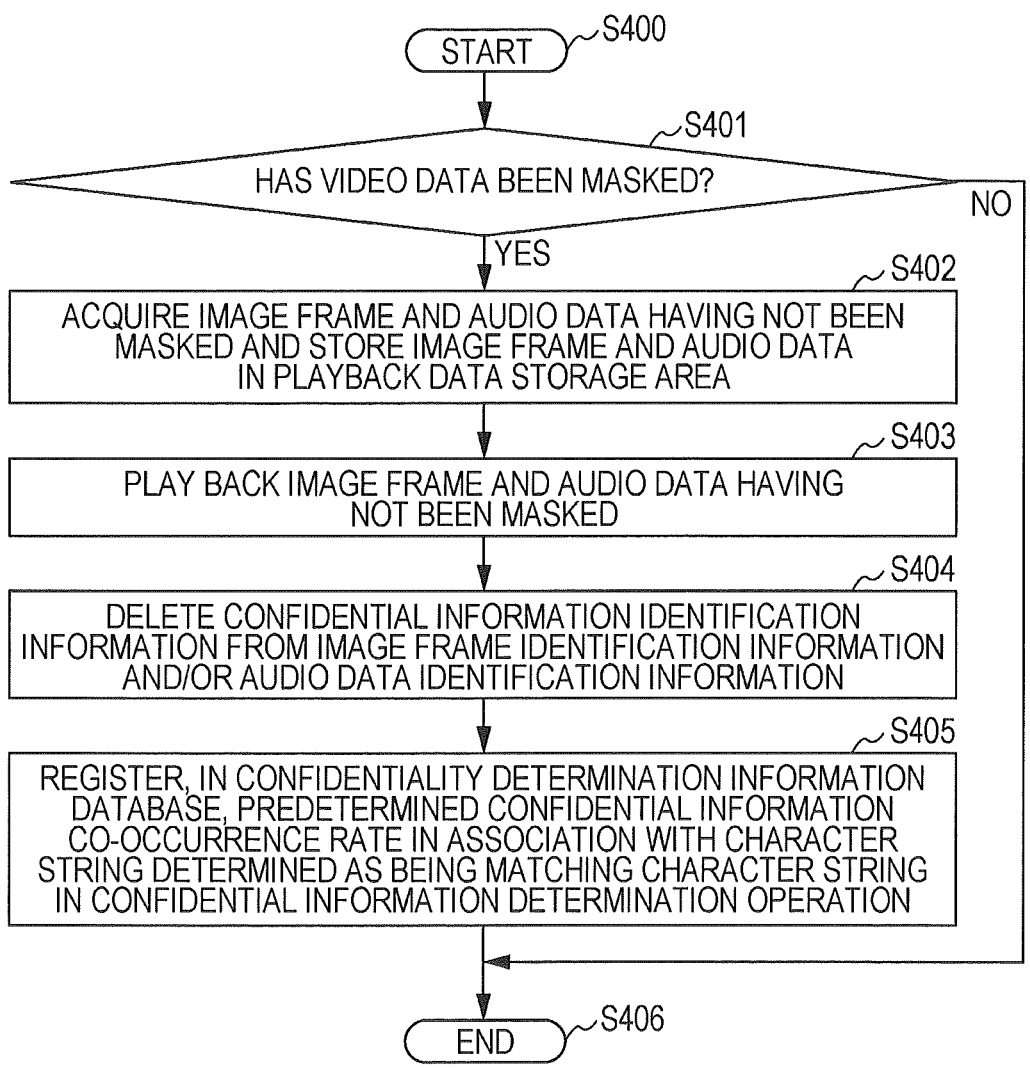
FIG. 4 is a flowchart illustrating an exemplary confidentiality determination information updating operation to be performed by the information processing apparatus according to an embodiment.

FIG. 4 is a flowchart illustrating an example of the confidentiality determination information updating operation to be performed by the information processing apparatus according to an embodiment. An example of the confidentiality determination information updating operation will next be described referring to FIG. 4.

The process in FIG. 4 is started from block S400 by the control unit 114 calling the updating unit 130 in the operation in block S210 shown in FIG. 2. In block S401, the updating unit 130 determines whether an image frame or an audio frame that is stored in the playback data storage area and has been played back has been masked.

In an embodiment, the masking unit 126 determines, using confidential information identification information added to image frame identification information and audio data identification information as metadata of an image frame and audio data, whether the image frame or the audio frame has been masked.

When the updating unit 130 determines, in the determination in block S401, that the image frame or the audio frame has been masked (yes), the process is caused to branch to block S402. On the other hand, when the updating unit 130 determines that the image frame or the audio frame has not been masked (no), the process is caused to branch to block S406 where the process is terminated.

In block S402, the updating unit 130 acquires, from the buffer memory 134, an image frame and audio data having not been masked and corresponding to the masked image frame and audio data stored in the playback data storage area and stores the acquired image frame and audio data in the playback data storage area. In an embodiment, the updating unit 130 identifies, using image frame identification information and audio data identification information, the image frame and the audio data having not been masked and corresponding to the masked image frame and audio data.

In block S403, the playback unit 128 plays back the image frame and audio data having not been masked and being stored in the playback data storage area. In block S404, the updating unit 130 deletes confidential information identification information from the image frame identification information and/or audio data identification information of the image frame and/or audio data, which has been acquired in block S402 and is stored in the buffer memory 134. In block S405, the updating unit 130 registers, referring to the confidentiality determination information database 136, a predetermined confidential information co-occurrence rate in association with the character string determined as being a matching character string in the confidential information determination operation shown in FIG. 3. Then, in block S406, the process is terminated. In an embodiment, it is assumed that a confidential information cooccurrence rate having been subjected to this correction takes a value at which no masking operation is performed.

In the embodiment shown in FIG. 4, when a masking operation during playback of video data in a streaming distribution operation is defective, i.e., when a masking operation is performed on an image frame and audio data by mistake, playback of the video data is interrupted by the confidentiality determination information updating operation triggered by an instruction to update confidentiality determination information from a user, and the image frame and audio data having not been masked are played back. Thus, in an embodiment, a user can view and hear an image frame and audio data having been masked by mistake by correcting the image frame and the audio data in real time.

Moreover, in an embodiment, a confidential information co-occurrence rate is corrected to an appropriate value by the confidentiality determination information updating operation. Thus, after playback of video data is restarted, the confidential information determination operation can be performed using the corrected confidential information co-occurrence rate, and the accuracy of a masking operation on, for example, an image frame and audio data to be played back can be improved.

Figure 5:
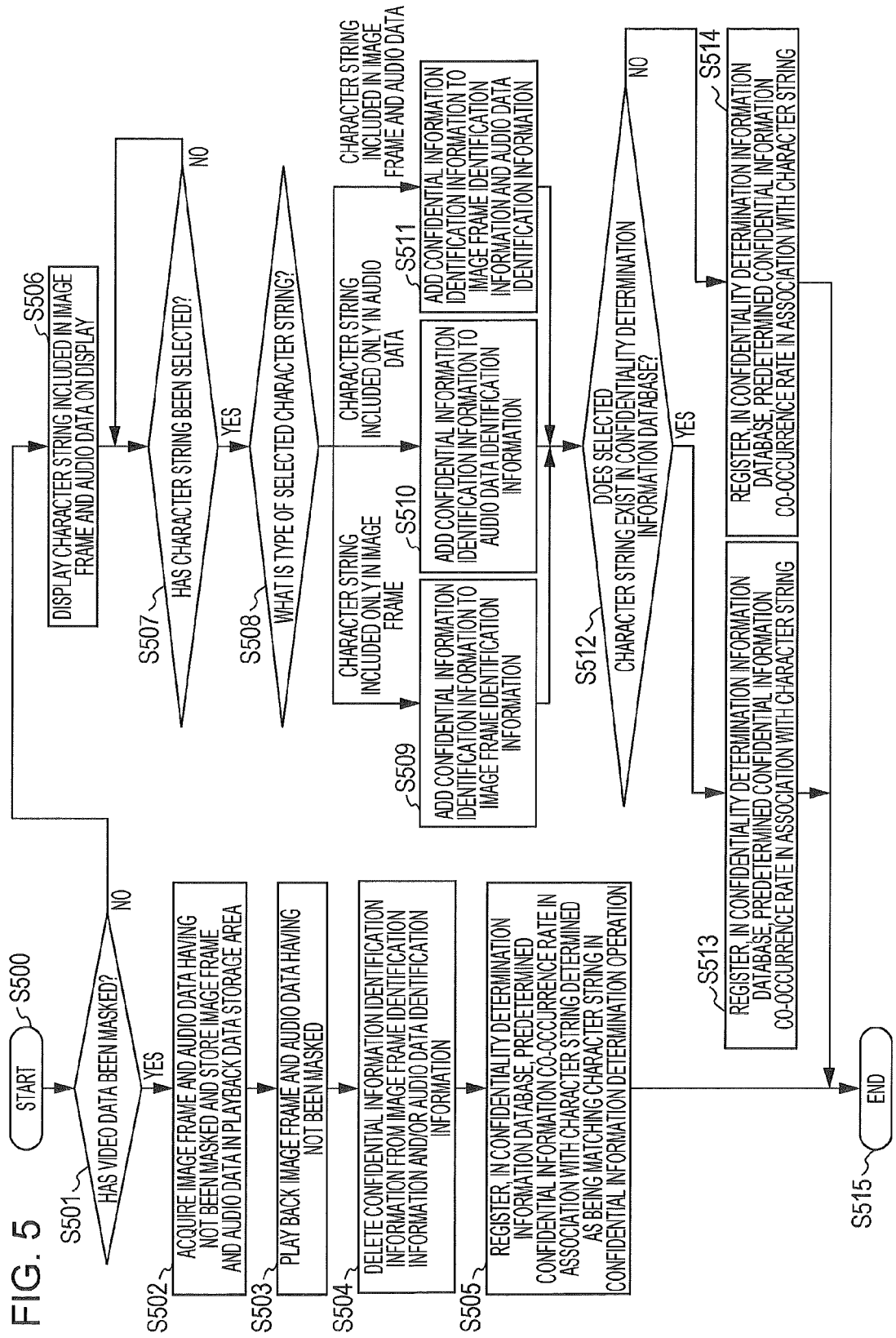
FIG. 5 is a flowchart illustrating another exemplary confidentiality determination information updating operation to be performed by the information processing apparatus according to an embodiment.

FIG. 5 is a flowchart illustrating another example of the confidentiality determination information updating operation to be performed by the information processing apparatus according to an embodiment. The other example of the confidentiality determination information updating operation will next be described referring to FIG. 5. In this case, operations in blocks S500 to S505 shown in FIG. 5 are the same as those in blocks S400 to S405 shown in FIG. 4. Thus, the description is omitted here.

In determination in block S501, when it is determined that an image frame or an audio frame to be played back has not been masked (no), the process is caused to branch to block S506. In block S506, the updating unit 130 calls the display unit 132, and the display unit 132 displays a screen on the display in the information processing apparatus 110. On the screen, a character string constituted by character information extracted and generated by the character information extraction unit 120 and the audio data conversion unit 122 in the operations shown in FIG. 2 can be selected.

In block S507, the display unit 132 determines whether the character string displayed on the display has been selected by a user. When the character string has not been selected (no), the operation in block S507 is repeated. On the other hand, when the display unit 132 determines that the character string has been selected (yes), the process is caused to branch to block S508. In block S508, the updating unit 130 determines whether the selected character string is a character string included only in an image frame, a character string included only in audio data, or a character string included in both an image frame and audio data.

In an embodiment, when the display unit 132 displays a character string on a display, identification information indicating that the character string is a character string included in an image frame and/or identification information indicating that the character string is a character string included in audio data is stored in the storage unit 138. The display unit 132 can determine, using these pieces of identification information stored in the storage unit 138, whether a character string selected by the user is a character string included only in an image frame, a character string included only in audio data, or a character string included in both an image frame and audio data.

When the updating unit 130 determines, in the determination in block S508, that the character string selected by the user is a character string included only in an image frame, the process is caused to branch to block S509. In block S509, the updating unit 130 adds confidential information identification information to the image frame identification information of the image frame including the character string.

When the updating unit 130 determines, in the determination in block S508, that the character string selected by the user is a character string included only in audio data, the process is caused to branch to block S510. In block S510, the updating unit 130 adds confidential information identification information to the audio data identification information of the audio data including the character string.

When the updating unit 130 determines, in the determination in block S508, that the character string selected by the user is a character string included in both an image frame and audio data, the process is caused to branch to block S511. In block S511, the updating unit 130 adds confidential information identification information to the image frame identification information of the image frame and the audio data identification information of the audio data including the character string.

In block S512, the updating unit 130 determines, referring to the confidentiality determination information database 136, whether the character string selected by the user is registered in the confidentiality determination information database 136. When the updating unit 130 determines that the character string is registered in the confidentiality determination information database 136 (yes), the process is caused to branch to block S513. In block S513, the updating unit 130 registers, in the confidentiality determination information database 136, a predetermined confidential information co-occurrence rate in association with the character string. Then, in block S515, the process is terminated.

On the other hand, when the updating unit 130 determines that the character string is not registered in the confidentiality determination information database 136 (no), the process is caused to branch to block S514. In block S514, the updating unit 130 registers, in the confidentiality determination information database 136, the predetermined confidential information co-occurrence rate in association with the character string. Then, in block S515, the process is terminated. In the embodiment, it is assumed that the predetermined confidential information co-occurrence rate takes a value at which a masking operation is performed on, for example, an image frame and audio data.

In the embodiment shown in FIG. 5, when a masking operation during playback of video data in a streaming distribution operation is defective, i.e., when a masking operation is performed on an image frame and audio data by mistake, playback of the video data is interrupted by the confidentiality determination information updating operation triggered by an instruction to update confidentiality determination information from a user, and the image frame and audio data having not been masked are played back. Thus, in the embodiment, a user can view and hear an image frame and audio data having been masked by mistake by correcting the image frame and the audio data in real time.

Moreover, in an embodiment, a confidential information co-occurrence rate is corrected to an appropriate value by the confidentiality determination information updating operation. Thus, after playback of video data is restarted, the confidential information determination operation can be performed using the corrected confidential information co-occurrence rate, and the accuracy of a masking operation on, for example, an image frame and audio data to be played back can be improved.

Moreover, in an embodiment, when an image frame, audio data, and the like including confidential information have not been masked, a screen on which the confidential information included in the image frame, audio data, and the like can be selected is displayed in response to an instruction to update confidentiality determination information from a user so that the user can select confidential information to be masked. Thus, the accuracy of determination of confidential information for subsequent video data to be played back can be improved, and a masking operation on confidential information can further be optimized.

Figure 6:
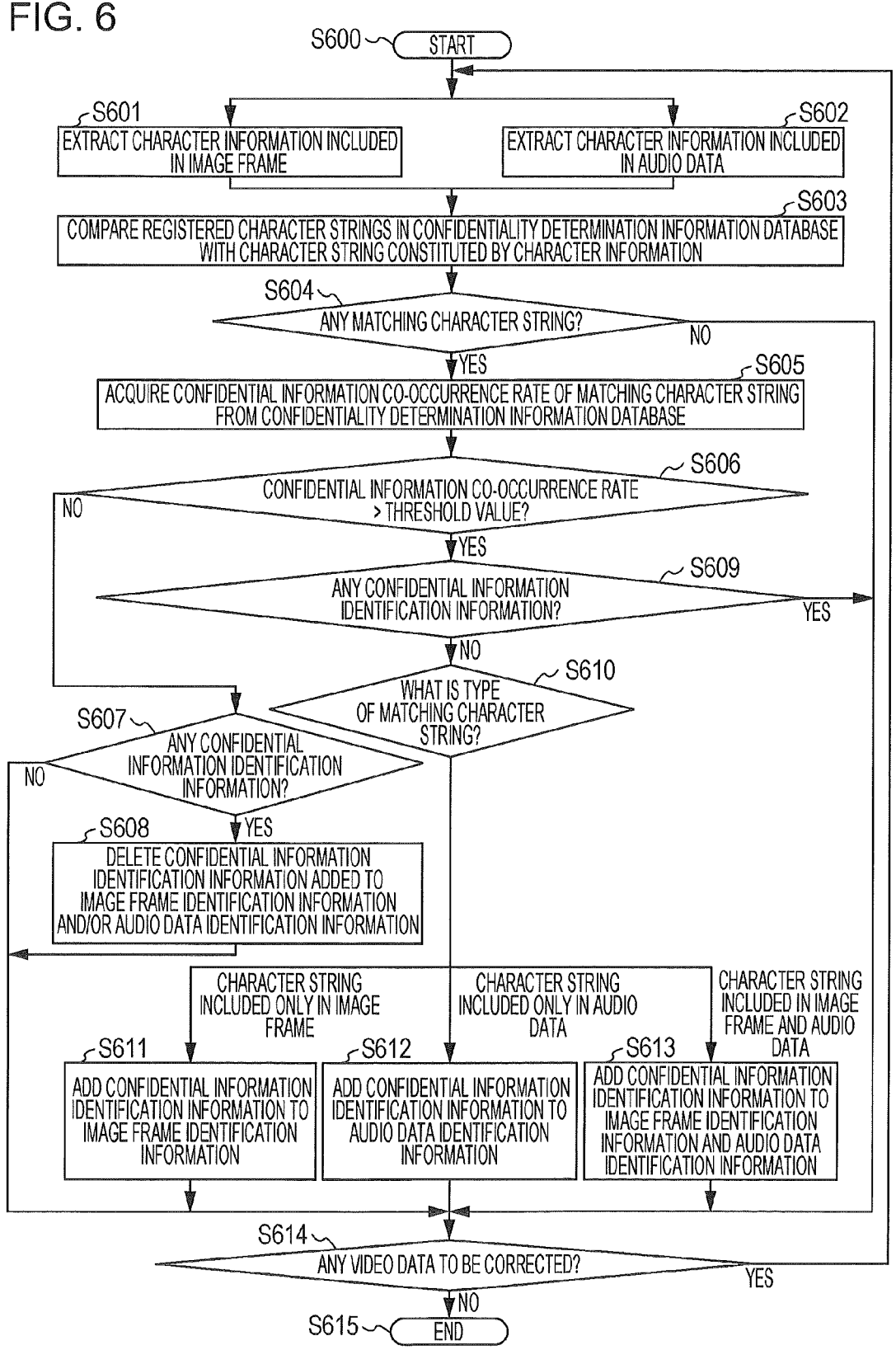
FIG. 6 is a flowchart illustrating an operation of correcting confidential information identification information to be performed by the information processing apparatus according to an embodiment.

FIG. 6 is a flowchart illustrating the operation of correcting confidential information identification information to be performed by the information processing apparatus according to an embodiment. The operation of correcting confidential information identification information will be described referring to FIG. 6, the operation correcting, for an image frame and audio data having been played back in streaming video data, confidential information identification information after the playback operation.

The process in FIG. 6 is started from block S600 by being called in block S213 shown in FIG. 2. In block S601, the control unit 114 calls the character information extraction unit 120, and the character information extraction unit 120 acquires an image frame from the buffer memory 134 in a FIFO manner and extracts character information from the image frame. In block S602, the control unit 114 calls the audio data conversion unit 122, and the audio data conversion unit 122 acquires audio data from the buffer memory 134 in a FIFO manner and generates character information from the audio data. In block S603, the control unit 114 calls the confidential information determination unit 124, and the confidential information determination unit 124 compares a character string constituted by character information extracted and generated in blocks S601 and S602 with registered character strings in the confidentiality determination information database 136.

In block S604, the confidential information determination unit 124 determines whether these character strings match each other. When these character strings do not match each other (no), the process is caused to branch to block S614. On the other hand, when these character strings match each other (yes), the process is caused to branch to block S605.

In block S605, the confidential information determination unit 124 acquires, referring to the confidentiality determination information database 136, a confidential information co-occurrence rate associated with a registered character string determined as being a matching character string in block S604. In block S606, the confidential information determination unit 124 determines whether the confidential information co-occurrence rate acquired in block S605 exceeds a predetermined threshold value. When the confidential information determination unit 124 determines that the confidential information co-occurrence rate is equal to or less than the predetermined threshold value, i.e., when the confidential information determination unit 124 determines that the probability that the character string includes confidential information is low (no), the process is caused to branch to block S607.

In block S607, the confidential information determination unit 124 determines whether confidential information identification information is added to at least one of the image frame identification information of the image frame and the audio data identification information of the audio data including the character string, the probability that the character string includes confidential information being determined as being low. When no confidential information identification information is added (no), the process is caused to branch to block S614. On the other hand, when confidential information identification information is added (yes), the process is caused to branch to block S608. In block S608, the confidential information determination unit 124 deletes the confidential information identification information from the image frame identification information and/or the audio data identification information, to which the confidential information identification information is added.

On the other hand, when the confidential information determination unit 124 determines, in the determination in block S606, that the confidential information cooccurrence rate exceeds the predetermined threshold value, i.e., when the confidential information determination unit 124 determines that the probability that the character string includes confidential information is high (yes), the process is caused to branch to block S609. In block S609, the confidential information determination unit 124 determines whether confidential information identification information is added to at least one of the image frame identification information of the image frame and the audio data identification information of the audio data including the character string, the probability that the character string includes confidential information being determined as being high. When the confidential information determination unit 124 determines that confidential information identification information is added to at least one of the image frame identification information of the image frame and the audio data identification information of the audio data (yes), the process is caused to branch to block S614. On the other hand, when the confidential information determination unit 124 determines that confidential information identification information is added to neither the image frame identification information of the image frame nor the audio data identification information of the audio data (no), the process is caused to branch to block S610.

In block S610, the confidential information determination unit 124 determines which of the image frame and the audio data the character string determined as being a matching character string in block S604 is included. In an embodiment, the confidential information determination unit 124 stores, in the storage unit 138 in the information processing apparatus 110, information for identifying which of a character string included in the image frame and a character string included in the audio data the character string determined as being a matching character string in block S604 is. Then, the confidential information determination unit 124 can determine, referring to the identification information, which of a character string included in the image frame and a character string included in the audio data the character string determined as being a matching character string is.

When the confidential information determination unit 124 determines, in the determination in block S610, that the character string determined as being a matching character string is included only in the image frame, the process is caused to branch to block S611. In block S611, the updating unit 130 adds confidential information identification information to the image frame identification information of the image frame including the character string.

When the confidential information determination unit 124 determines, in the determination in block S610, that the character string determined as being a matching character string is included only in the audio data, the process is caused to branch to block S612. In block S612, the updating unit 130 adds confidential information identification information to the audio data identification information of the audio data including the character string.

When the confidential information determination unit 124 determines, in the determination in block S610, that the character string determined as being a matching character string is included in both the image frame and the audio data, the process is caused to branch to block S613. In block S613, the updating unit 130 adds confidential information identification information to the image frame identification information of the image frame and the audio data identification information of the audio data including the character string.

In block S614, the control unit 114 determines whether any image frame and audio data the confidential information identification information of which needs to be corrected exist in the buffer memory 134.

In an embodiment, the character information extraction unit 120 and the audio data conversion unit 122 respectively acquire an image frame and audio data from the buffer memory 134 in a FIFO manner and determine whether any image frame and audio data to be corrected exist in the buffer memory 134. In another embodiment, using the identification information of an image frame or the identification information of audio data including a time stamp when video data was received, an image frame and audio data indicated by the identification information of an image frame and the identification information of audio data including the oldest time stamp may be first acquired in a sequential manner, and it may be determined whether any image frame and audio data to be corrected exist in the buffer memory 134.

When the control unit 114 determines, in the determination in block S614, that an image frame and audio data to be corrected exist (yes), the process is caused to return to blocks S601 and S602, and the aforementioned operations are repeated. On the other hand, when the control unit 114 determines that any image frame and audio data to be corrected do not exist (no), the process is caused to branch to block S615 where the process is terminated.

In the embodiment shown in FIG. 6, when confidential information registered in the confidentiality determination information database 136 is updated by performing the confidentiality determination information updating operation in real time concomitantly with a streaming operation, for an image frame and audio data having been already played back, confidential information identification information can be corrected after the playback operation, using the updated confidential information.

FIG. 7 is a flowchart illustrating a process of the information processing apparatus according to an embodiment updating confidential information after streaming playback of video data is completed. The process of updating confidential information after streaming playback is completed will next be described referring to FIG. 7.

The process in FIG. 7 is started by the control unit 114 in the information processing apparatus 110 receiving an instruction to play back video data issued by a user in block S700. In block S701, the control unit 114 acquires an image frame and audio data stored in the buffer memory 134 in the process in FIG. 2 in a FIFO manner. In block S702, the control unit 114 determines, using the image frame identification information of the image frame and the audio data identification information of the audio data, whether any confidential information exists in the image frame and the audio data. When the control unit 114 determines that no confidential information exists (no), the process is caused to branch to block S703. In block S703, the control unit 114 stores the image frame and the audio data in the playback data storage area.

On the other hand, when the control unit 114 determines, in the determination in block S702, that confidential information exists in the image frame and the audio data (yes), the process is caused to branch to block S704. In block S704, the control unit 114 calls the masking unit 126 to cause the masking unit 126 to mask the image frame and/or the audio data including the confidential information. Then, the control unit 114 stores the masked image frame and/or audio data in the playback data storage area.

In block S705, the control unit 114 calls the playback unit 128, and the playback unit 128 plays back the image frame and the audio data stored in the playback data storage area. In block S706, the control unit 114 determines whether an instruction to update confidentiality determination information has been received. When the control unit 114 determines that no updating instruction has been received (no), the process is caused to branch to block S708.

On the other hand, when the control unit 114 determines that an updating instruction has been received (yes), the process is caused to branch to block S707. In block S707, the control unit 114 calls the updating unit 130, and the updating unit 130 performs a confidentiality determination information updating operation, such as that shown in FIG. 8.

In an embodiment, in the same manner as that in the embodiment described referring to FIG. 2, the control unit 114 may store, in the storage unit 138, an updating instruction that is an interrupt instruction issued by a user pressing a button for updating confidentiality determination information. The control unit 114 can determine, referring to the storage unit 138, whether an instruction to update confidentiality determination information has been received.

In block S708, the control unit 114 determines, referring to the buffer memory 134, whether any video to be played back exists.

In an embodiment, the character information extraction unit 120 and the audio data conversion unit 122 respectively acquire an image frame and audio data from the buffer memory 134 in a FIFO manner and determine whether any image frame and audio data to be corrected exist in the buffer memory 134. In another embodiment, using the identification information of an image frame or the identification information of audio data including a time stamp when video data was received, an image frame and audio data indicated by the identification information of an image frame and the identification information of audio data including the oldest time stamp may be first acquired in a sequential manner, and it may be determined whether any image frame and audio data to be corrected exist in the buffer memory 134.

When video to be played back exists in the determination in block S708 (yes), the process is caused to return to block S701, and the aforementioned operations are repeated. On the other hand, when the control unit 114 determines that no video to be played back exists (no), the process is caused to branch to block S709 where the process is terminated.

In the embodiment shown in FIG. 7, even when the confidentiality determination information updating operation has not been performed in a streaming operation shown in FIG. 2, a user can update confidentiality determination information after the streaming operation. Thus, in subsequent streaming operations, an image frame, audio data, and the like can be masked using more correct confidentiality information, and the accuracy of masking can further be improved.

FIG. 8 is a flowchart illustrating a confidentiality determination information updating operation to be performed by the information processing apparatus according to an embodiment after streaming playback is completed. An example of the confidentiality determination information updating operation to be performed after streaming playback is completed will next be described referring to FIG. 8.

The process in FIG. 8 is started from block S800 by the control unit 114 calling the updating unit 130 in the operation in block S707 shown in FIG. 7. In block S801, the control unit 114 calls the character information extraction unit 120, and the character information extraction unit 120 extracts character information from an image frame that was being played back when an instruction to update confidentiality determination information was received in block S706 in FIG. 7.

In block S802, the control unit 114 calls the audio data conversion unit 122, and the audio data conversion unit 122 generates character information from audio data that was being played back when the instruction to update confidentiality determination information was received in block S706 in FIG. 7. In an embodiment, the audio data conversion unit 122 preferably generates character information from several seconds, around the time when an instruction to update confidentiality determination information was received, of audio data including audio data that was being played back at the time.

In block S803, the control unit 114 calls the updating unit 130, and the updating unit 130 determines whether confidential information identification information is added to the image frame identification information of an image frame or the audio data identification information of audio data played back in the operation in block S705, i.e., the updating unit 130 determines whether the image frame or the audio data has been masked.

When the updating unit 130 determines, in the determination in block S803, that confidential information identification information is added to the image frame identification information or the audio data identification information (yes), the process is caused to branch to block S804. In block S804, the updating unit 130 deletes the confidential information identification information added to the image frame identification information and/or the audio data identification information. In block S805, the updating unit 130 determines, referring to the confidentiality determination information database 136, a character string matching a character string constituted by the respective pieces of character information extracted and generated in blocks S801 and S802. In block S806, the updating unit 130 changes, referring to the confidentiality determination information database 136, a confidential information co-occurrence rate associated with the matching character string to a predetermined confidential information co-occurrence rate. Then, in block S816, the process is terminated. In the embodiment, it is assumed that the changed confidential information co-occurrence rate takes a value at which no masking operation is performed.

On the other hand, when the updating unit 130 determines, in the determination in block S803, that confidential information identification information is added to neither the image frame identification information nor the audio data identification information, i.e., when the updating unit 130 determines that neither the image frame nor the audio data has been masked (no), the process is caused to branch to block S807. In block S807, the control unit 114 calls the display unit 132, and the display unit 132 displays, on the display in the information processing apparatus 110, the character string constituted by the respective pieces of character information extracted and generated in blocks S801 and S802. In block S808, the display unit 132 determines whether a user has selected the character string displayed on the display. When the user has not selected the character string (no), the operation in block S808 is repeated. On the other hand, when the user has selected the character string (yes), the process is caused to branch to block S809.

In block S809, the updating unit 130 determines whether the character string selected in block S808 is a character string included only in the image frame, a character string included only in the audio data, or a character string included in both the image frame and the audio data.

In an embodiment, when a user has selected a character string, the display unit 132 is notified of an event indicating that the character string has been selected. The display unit 132 can determine, by receiving the event, whether the character string has been selected. Moreover, when a character string extracted and generated from an image frame and audio data is displayed on the display, the display unit 132 stores, in the storage unit 138, identification information indicating whether the character string is a character string included in an image frame or a character string included in audio data. The display unit 132 can determine, using the identification information, whether a character string selected by a user is included only in an image frame, only in audio data, or in both an image frame and audio data.

When the updating unit 130 determines, in the determination in block S809, that the selected character string is a character string included only in the image frame, the process is caused to branch to block S810. In block S810, the updating unit 130 adds confidential information identification information to the image frame identification information of the image frame including the character string.

When the updating unit 130 determines, in the determination in block S809, that the selected character string is a character string included only in the audio data, the process is caused to branch to block S811. In block S811, the updating unit 130 adds confidential information identification information to the audio data identification information of the audio data including the character string.

When the updating unit 130 determines, in the determination in block S809, that the selected character string is a character string included in both the image frame and the audio data, the process is caused to branch to block S812. In block S812, the updating unit 130 adds confidential information identification information to the image frame identification information of the image frame and the audio data identification information of the audio data including the character string.

In block S813, the updating unit 130 determines, referring to the confidentiality determination information database 136, whether the character string selected by the user exists in the confidentiality determination information database 136. When the updating unit 130 determines that the character string exists in the confidentiality determination information database 136 (yes), the process is caused to branch to block S814. In block S814, the updating unit 130 registers, in the confidentiality determination information database 136, a predetermined confidential information co-occurrence rate in association with the character string. Then, in block S816, the process is terminated.

On the other hand, when the updating unit 130 determines that the selected character string does not exist in the confidentiality determination information database 136 (no), the process is caused to branch to block S815. In block S815, the updating unit 130 registers, in the confidentiality determination information database 136, the predetermined confidential information co-occurrence rate in association with the character string. Then, in block S816, the process is terminated. In an embodiment, it is assumed that the changed confidential information co-occurrence rate takes a value at which a masking operation is performed.

In the embodiment shown in FIG. 8, a user can update confidential information after streaming is completed. That is, for example, new registration of confidential information and correction of a confidential information co-occurrence rate are enabled by feedback of confidential information to an information processing apparatus by a user. Thus, the accuracy of determination of confidential information by an information processing apparatus can be continuously improved.

FIG. 9 is an illustration showing a confidentiality determination information data table registered in the confidentiality determination information database according to an embodiment. A confidentiality determination information data table 900 registered in the confidentiality determination information database 136 will next be described referring to FIG. 9.

The confidentiality determination information data table 900 is a data table in which confidentiality determination information is registered. In the confidentiality determination information data table 900, a registered character string 910 is registered in association with a confidential information co-occurrence rate 912. Each character string that may co-occur with confidential information is registered in the registered character string 910. In an embodiment shown in FIG. 9, character strings such as "o-namae to gojuusho" (name and address) and "o-namae to denwa-bangoo" (name and telephone number) used in, for example, conversations used in Internet banking with a financial institution and conversations used in Internet shopping are registered as character strings in a strong co-occurrence relation with, for example, personal information. In another embodiment, character strings in a strong co-occurrence relation with personal information, such as "login", "password", and "user ID", may be registered.

The confidential information co-occurrence rate of each registered character string is registered in the confidential information co-occurrence rate 912. In an embodiment, the confidential information co-occurrence rate of each registered character string is calculated using Bayes' theorem.

In the embodiment shown in FIG. 9, for example, a registered character string "o-namae to go-juusho o o-shirase-shimasu" (will tell name and address) is registered in association with a confidential information co-occurrence rate of 0.9, larger than a predetermined threshold value of 0.5 for a confidential information co-occurrence rate used in determination of confidential information. Thus, the confidential information determination unit 124 can determine that the registered character string "o-namae to gojuusho o o-shirase-shimasu" (will tell name and address) is confidential information. On the other hand, a registered character string "o-namae to go-juusho o o-shirase-kudasai" (please, tell your name and address) is registered in association with a confidential information co-occurrence rate of 0.4 smaller than the predetermined threshold value of 0.5. Thus, the confidential information determination unit 124 can determine that the registered character string "o-namae to go-juusho o o-shirase-kudasai" (please, tell your name and address) is not confidential information.

Specific character strings and confidential information co-occurrence rates are shown in the confidentiality determination information data table 900 shown in FIG. 9 for illustrative purpose only, and any character strings and confidential information cooccurrence rates other than those shown in the embodiment may be registered. Moreover, while a confidential information co-occurrence rate of 0.5 is adopted as a predetermined threshold value in the embodiment, in another embodiment, any another value may be used as a threshold value.

While the embodiments have been described, the present invention is not limited to the aforementioned embodiments, in particular, a case where determination of confidential information is performed for a plurality of consecutive image frames distributed as video data. Another embodiment in which determination of confidential information is performed for an image frame supplied as a still image, an addition, a change, and a deletion could be made within a range that could be easily reached by those skilled in the art and are included in the scope of the present invention as long as the operations and effects of the present invention are achieved.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An information processing apparatus for filtering confidential information included in image and voice data, the information processing apparatus comprising:
   a memory storing computer code instructions thereon; and
   a processor, where the memory, with the computer code instructions, and the processor are configured to cause the apparatus to implement:
   a determination unit configured to determine using determination information, whether at least one of an image frame and audio data include confidential information by determining whether at least one of a character string extracted from the image frame and a character string converted from the audio data includes confidential information; and
   a masking unit configured to conceal contents of the image frame responsive to determining that the image frame includes confidential information, and the masking unit further configured to make the audio data inaudible responsive to determining that the audio data includes confidential information.

2. The information processing apparatus according to claim 1 further comprising:
   a database, wherein character strings that may co-occur with confidential information and respective confidential information co-occurrence rates of the character strings are registered in association with each other as the determination information, and
   the determination unit determines that at least one of the image frame and the audio data include confidential information responsive to determining that a confidential information co-occurrence rate of a character string matching the character string extracted from at least one of the image frame and the character string converted from the audio data exceeds a predetermined threshold value.

3. The information processing apparatus according to claim 1, further comprising:
   an updating unit configured for updating the determination information registered in a database,
   wherein the updating unit is configured to change a confidential information co-occurrence rate registered in the database in association with the character string determined as including confidential information to a confidential information co-occurrence rate indicating non-confidential information.

4. The information processing apparatus according to claim 3, wherein the updating unit is further configured for registering a character string selected by a user in the database in association with a confidential information co-occurrence rate indicating confidential information.

5. The information processing apparatus according to claim 3, wherein the updating unit is further configured for changing a confidential information co-occurrence rate registered in the database in association with the character string, which is determined as including no confidential information and selected by a user, to a confidential information co-occurrence rate indicating confidential information.

6. The information processing apparatus according to claim 3, further comprising:
a storage unit configured for storing the image frame and the audio data after play back,
wherein the updating unit is further configured for changing, when a playback unit plays back the image frame and the audio data stored in the storage unit, a confidential information co-occurrence rate registered in the database in association with the character string determined as including confidential information to a confidential information co-occurrence rate indicating non-confidential information.

7. The information processing apparatus according to claim 6, wherein the updating unit is further configured for registering, when the playback unit plays back the image frame and the audio data stored in the storage unit, a character string selected by a user in the database in association with a confidential information co-occurrence rate indicating confidential information.

8. The information processing apparatus according to claim 6, wherein the updating unit is configured for changing, when the playback unit plays back the image frame and the audio data stored in the storage unit, a confidential information co-occurrence rate registered in the database in association with the character string, which is determined as including no confidential information and selected by a user, to a confidential information co-occurrence rate indicating confidential information.

9. A computer implemented method for filtering confidential information included in image and voice data, the method implemented by one or more processors executing computer code instructions and comprising:
determining, using determination information, whether at least one of an image frame and audio data includes confidential information by determining whether at least one of a character string extracted from the image frame and a character string converted from the audio data includes confidential information;
concealing contents of the image frame responsive to determining that the image frame includes confidential information; and
making the audio data inaudible responsive to determining that the audio data includes confidential information.

10. The method according to claim 9, wherein, in a database, character strings that may co-occur with confidential information and respective confidential information co-occurrence rates of the character strings are registered in association with each other as the determination information, and
the determining includes, upon determining that a confidential information co-occurrence rate of a character string matching the character string extracted from the image frame exceeds a predetermined threshold that the image frame includes confidential information, and upon determining that a confidential co-occurrence rate of a character string matching the character string converted from the audio data exceeds the predetermined threshold value that the audio data includes confidential information.

11. The method according to claim 9, further comprising:
updating the determination information registered in a database,
wherein the updating includes changing a confidential information co-occurrence rate registered in the database in association with the character string determined as including confidential information to a confidential information co-occurrence rate indicating non-confidential information.

12. The method according to claim 11, wherein the updating further includes registering a character string selected by a user in the database in association with a confidential information co-occurrence rate indicating confidential information.

13. The method according to claim 11, wherein the updating further includes changing a confidential information co-occurrence rate registered in the database in association with the character string, which is determined as including no confidential information and selected by a user, to a confidential information co-occurrence rate indicating confidential information.

14. A computer program product for filtering confidential information included in image and voice data, the computer program product comprising:
a non-transitory computer readable storage medium having computer readable program code embodied therewith, the computer readable program code comprising:
computer readable program code configured for:
determining, using determination information, whether at least one of an image frame and audio data includes confidential information by determining whether at least one of a character string extracted from the image frame and a character string converted from the audio data includes confidential information;
concealing contents of the image frame responsive to determining that the image frame includes confidential information; and
making the audio data inaudible responsive to determining that the audio data includes confidential information.

15. The computer program product according to claim 14, wherein, in a database, character strings that may co-occur with confidential information and respective confidential information co-occurrence rates of the character strings are registered in association with each other as the determination information, and
the determining includes, upon determining that a confidential information co-occurrence rate of a character string matching the character string extracted from the image frame exceeds a predetermined threshold that the image frame includes confidential information, and upon determining that a confidential co-occurrence rate of a character string matching the character string converted from the audio data exceeds the predetermined threshold value that the audio data includes confidential information.

16. The computer program product according to claim 14, wherein the computer readable program code is further configured for:
updating the determination information registered in a database, wherein the updating includes changing a confidential information co-occurrence rate registered in the database in association with the character string determined as including confidential information to a confidential information co-occurrence rate indicating non-confidential information.

17. The computer program product according to claim 16, wherein the updating further includes registering a character string selected by a user in the database in association with a confidential information co-occurrence rate indicating confidential information.

18. The computer program product according to claim 16, wherein the updating further includes changing a confidential information co-occurrence rate registered in the database in association with the character string, which is determined as including no confidential information and selected by a user, to a confidential information co-occurrence rate indicating confidential information.

\* \* \* \* \*